US009074087B2

(12) United States Patent
Chen et al.

(10) Patent No.: US 9,074,087 B2
(45) Date of Patent: Jul. 7, 2015

(54) CURABLE COMPOSITION, PRESSURE-SENSITIVE ADHESIVE, METHOD OF MAKING THE SAME, AND ADHESIVE ARTICLES

(75) Inventors: Zhong Chen, Woodbury, MN (US); Jingjing Ma, Cottage Grove, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 225 days.

(21) Appl. No.: 13/635,049

(22) PCT Filed: Apr. 27, 2011

(86) PCT No.: PCT/US2011/034049

§ 371 (c)(1),
(2), (4) Date: Sep. 14, 2012

(87) PCT Pub. No.: WO2011/142964

PCT Pub. Date: Nov. 17, 2011

(65) Prior Publication Data

US 2013/0045376 A1 Feb. 21, 2013

Related U.S. Application Data

(60) Provisional application No. 61/333,560, filed on May 11, 2010.

(51) Int. Cl.

| | |
|---|---|
| ***C08F 2/50*** | (2006.01) |
| ***B29C 71/04*** | (2006.01) |
| ***A61L 2/08*** | (2006.01) |
| ***A61L 24/00*** | (2006.01) |
| ***C08F 2/46*** | (2006.01) |
| ***C08G 61/04*** | (2006.01) |
| ***C08L 23/16*** | (2006.01) |
| ***C09J 7/02*** | (2006.01) |
| ***C09J 123/16*** | (2006.01) |
| *C08K 5/00* | (2006.01) |
| *C08K 5/01* | (2006.01) |
| *C08K 5/3492* | (2006.01) |

(52) U.S. Cl.

CPC ............ *C08L 23/16* (2013.01); *Y10T 428/2809* (2015.01); *Y10T 428/2804* (2015.01); *C08K 5/0025* (2013.01); *C08K 5/01* (2013.01); *C08K 5/3492* (2013.01); *C09J 7/0246* (2013.01); *C09J 123/16* (2013.01); *C09J 2205/102* (2013.01); *C09J 2400/163* (2013.01); *C09J 2400/226* (2013.01); *C09J 2423/00* (2013.01); *C09J 2423/16* (2013.01)

(58) Field of Classification Search

CPC .... C08L 23/16; C08L 2666/04; C09J 123/16; C09J 2423/16; C09J 2400/226; C09J 2205/102; C09J 7/0246; C09J 2423/00; C09J 2400/163; C08K 5/0025; C08K 5/01; C08K 5/3492

USPC ........................ 522/6, 71, 189, 184, 1; 520/1

See application file for complete search history.

(56) References Cited

U.S. PATENT DOCUMENTS

| | | | | |
|---|---|---|---|---|
| 2,933,480 | A | 4/1960 | Gresham | |
| 3,093,620 | A | 6/1963 | Gladding et al. | |
| 3,093,621 | A | 6/1963 | Gladding | |
| 3,113,115 | A | 12/1963 | Ziegler et al. | |
| 3,211,709 | A | 10/1965 | Adamek | |
| 3,280,082 | A | 10/1966 | Natta et al. | |
| 4,330,590 | A | 5/1982 | Vesley | |
| 4,379,114 | A | 4/1983 | Fujiki et al. | |
| 4,404,056 | A | 9/1983 | Kakehi et al. | |
| 4,581,092 | A | 4/1986 | Westley et al. | |
| 5,242,727 | A | 9/1993 | Briddell et al. | |
| 5,244,962 | A | 9/1993 | Plamthottam et al. | |
| 5,504,136 | A | 4/1996 | Davis et al. | |
| 5,563,217 | A * | 10/1996 | Davis et al. | 525/194 |
| 5,602,221 | A | 2/1997 | Bennett et al. | |
| 6,489,400 | B2 | 12/2002 | Khandpur et al. | |
| 6,544,643 | B1 | 4/2003 | Hyde et al. | |
| 2003/0113534 | A1 | 6/2003 | Poisson | |
| 2007/0042193 | A1 * | 2/2007 | Wang | 428/423.1 |
| 2009/0105437 | A1 * | 4/2009 | Determan et al. | 526/286 |
| 2012/0128966 | A1 | 5/2012 | Ma et al. | |

FOREIGN PATENT DOCUMENTS

| | | | |
|---|---|---|---|
| CN | 1036391 | A | 10/1989 |
| CN | 1820034 | A | 8/2006 |
| EP | 0 322 138 | A2 | 6/1989 |

(Continued)

OTHER PUBLICATIONS

Monroe et al., "Photoinitiators for Free-Radical-Initiated Photoimaging Systems", Chemical Reviews, 1993, vol. 93, No. 1, pp. 435-448.

Wang, "Photocrosslinking of an Ethylene—Propylene—Diene Terpolymer and the Characterization of Its Structure and Mechanical Properties", Journal of Applied Polymer Science, 2004, vol. 93, pp. 1837-1845.

Hilborn et al., "Photocross-Linking of EPDM Elastomers. Reactions with Model Compounds Studied by Electron Spin Resonance", Macromolecules, 1989, vol. 22, No. 3, pp. 1154-1159.

(Continued)

*Primary Examiner* — Ling Choi
*Assistant Examiner* — Jessica E Whiteley
(74) *Attorney, Agent, or Firm* — Bradford B. Wright

(57) ABSTRACT

A curable composition includes components: a) at least one ethylene-propylene-(nonconjugated diene) terpolymer; b) at least one ethylene-propylene copolymer; c) at least one bis (halomethyl)triazine crosslinker; and d) at least one tackifier. A weight ratio of component a) to component b) is in a range of from 15:85 to 85:15. A pressure-sensitive adhesive includes an at least partially crosslinked reaction product of the curable composition. Adhesive articles including the pressure-sensitive adhesive are disclosed.

16 Claims, 1 Drawing Sheet

(56) References Cited

FOREIGN PATENT DOCUMENTS

| | | | |
|---|---|---|---|
| EP | 0 690 074 | A1 | 1/1996 |
| EP | 0 714 963 | A2 | 6/1996 |
| JP | H08-319305 | | 12/1996 |
| JP | H11-501342 | | 2/1999 |
| JP | 2000-512683 | | 9/2000 |
| JP | 2001-303010 | | 10/2001 |
| WO | WO 96/26967 | | 9/1996 |
| WO | WO 97/48777 | | 12/1997 |
| WO | WO 02/051931 | A1 | 7/2002 |
| WO | WO 2007/149851 | | 12/2007 |
| WO | WO 2009/029476 | A1 | 3/2009 |

OTHER PUBLICATIONS

"Norrish Type I photoreaction", IUPAC Compendium of Chemical Terminology, 2008, one page.

International Search Report, PCT/US2011/034049, mailed Jul. 11, 2011, 3 pages.

* cited by examiner

CURABLE COMPOSITION, PRESSURE-SENSITIVE ADHESIVE, METHOD OF MAKING THE SAME, AND ADHESIVE ARTICLES

CROSS-REFERENCE TO RELATED APPLICATIONS

This application is a national stage filing under 35 U.S.C. 371 of PCT/US2011/034049, filed Apr. 27, 2011, which claims priority to U.S. Provisional Application No. 61/333,560, filed May 11, 2010, the disclosures of which is incorporated by reference in their entirety herein.

TECHNICAL FIELD

The present disclosure relates broadly to adhesive compositions and adhesive articles.

BACKGROUND

Increasing usage of thermoplastic elastomers (TPEs) and thermoplastic polyolefins in automotives, appliances, and electronics applications is an emerging trend in global markets. However, preparing adhesives that can reliably bond to TPE surfaces is challenging due to their low surface energy and elastic nature. Furthermore, TPEs often contain large amounts of oil and other additives, which may migrate into the adhesive and reduce its adhesive properties over time. Bonding to these surfaces usually requires a primer, which leads to extra costs and environmental concerns.

SUMMARY

In one aspect, the present disclosure provides a curable composition comprising components:

a) at least one ethylene-propylene-(nonconjugated diene) terpolymer;

b) at least one ethylene-propylene copolymer;

c) at least one bis(halomethyl)triazine crosslinker; and d) at least one tackifier, wherein a weight ratio of component a) to component b) is in a range of from 15:85 to 85:15.

In some embodiments, the curable composition further comprises the components further comprise:

e) at least one Type-I photoinitiator; and f) at least one polyfunctional (meth)acrylate.

In some embodiments, the curable composition is hot melt extrudable.

In another aspect, the present disclosure provides a method of making a pressure-sensitive adhesive, the method comprising at least partially curing a curable composition according to the present disclosure. In some embodiments, the at least partially curing comprises exposing the curable composition to actinic radiation.

In another aspect, the present disclosure provides a pressure-sensitive adhesive comprising art at least partially crosslinked reaction product of components comprising:

a) at least one ethylene-propylene-nonconjugated diene terpolymer;

b) at least one ethylene-propylene copolymer;

c) at least one bis(halomethyl)triazine crosslinker; and d) at least one tackifier, wherein a weight ratio of component a) to component b) is in a range of from 15:85 to 85:15.

In some embodiments, the components further comprise: e) at least one Type-I photoinitiator; and f) at least one polyfunctional (meth)acrylate. In some embodiments, a weight ratio of component a) to component b) is in a range of from 15:85 to 35:65. In some embodiments, a weight ratio of component a) to component b) is in a range of from 35:65 to 65:35. In some embodiments, component d) is present in an amount of from 50 to 150 parts by weight per hundred parts by weight of components a) and b) combined. In some embodiments, the tackifier comprises a hydrogenated tackifier. In some embodiments, the pressure-sensitive adhesive is hot melt extrudable.

In another aspect, the present disclosure provides an adhesive article comprising a first pressure-sensitive adhesive according to the present disclosure adhered to a first major surface of a substrate. In some embodiments, the first pressure-sensitive adhesive is releasably adhered to the substrate. In some embodiments, the adhesive article further comprises a second pressure-sensitive adhesive according to the present disclosure adhered to a second major surface of the substrate opposite the first major surface. In some embodiments, the substrate comprises at least one of a polymer film and a metal foil. In some embodiments, the substrate comprises a foam.

Advantageously, pressure-sensitive adhesives according to the present disclosure are typically easy to manufacture, provide a balance of peel/shear performance, have good "quick-grab" and surface tack, and may exhibit excellent ultraviolet light (UV) resistance. For example, pressure-sensitive adhesives according to the present disclosure typically exhibit durable adhesion to EPDM, thermoplastic elastomeric substrates, and thermoplastic polyolefins during heat aging without need of a primer layer, and are suitable for use as permanent bonding solutions in various demanding industrial and automotive applications.

In addition, radiation (e.g., ultraviolet and/or visible light, or electron beam) may be used to cure the adhesive during manufacture, which may have a relatively higher productivity rate than conventional thermal processes.

The foregoing embodiments may be implemented in any combination thereof, unless such combination is clearly erroneous in view of the teachings of the present disclosure. The features and advantages of the present disclosure will be further understood upon consideration of the detailed description as well as the appended claims.

Figure 1:
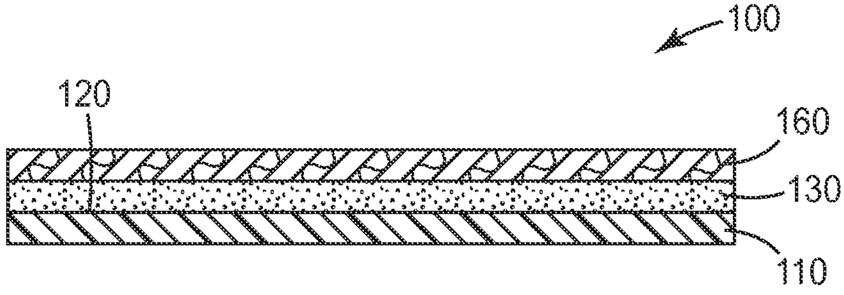
FIG. 1 is a side view of an exemplary adhesive article according to one embodiment of the present disclosure.

While the above-identified drawing figures set forth several embodiments of the present disclosure, other embodiments are also contemplated, as noted in the discussion. In all cases, this disclosure presents the disclosure by way of representation and not limitation. It should be understood that numerous other modifications and embodiments can be devised by those skilled in the art, which fall within the scope and spirit of the principles of the disclosure. The figures may not be drawn to scale. Like reference numbers may have been used throughout the figures to denote like parts.

DETAILED DESCRIPTION

Curable compositions according to the present disclosure include at least one ethylene-propylene-(nonconjugated diene) terpolymer, commonly known in the art as EPDM. EPDM is a terpolymer of ethylene, propylene, and a nonconjugated diene. The two most widely used non-conjugated dienes are ethylidene norbornene (ENB) and dicyclopentadiene (DCPD), although other nonconjugated dienes may also be used. The backbone of the EPDM polymer is generally free of carbon-carbon double bonds, which reside in groups that are pendant from the polymer backbone.

Typically, the ethylene residue content is from about 45 to about 90 percent by weight, based on the total weight of the EPDM, although other amounts may also be used. In general, relatively high ethylene residue content increases: the loading capacity of the EPDM, and it mixing and extrusion properties.

Examples of nonconjugated dienes which may be used in the EPDM terpolymer include dicyclopentadiene, alkyldicyclopentadiene, 1,4-pentadiene, 1,4-hexadiene, 1,5-hexadiene, 1,4-heptadiene, 2-methyl-1,5-hexadiene, 1,5-cyclooctadiene, 1,4-octadiene, 1,7-octadiene, 5-ethylidene-2-norbornene (ENB), 5-n-propylidene-2-norbornene, 5-(2-methyl-2-butenyl)-2-norbornene and the like. The nonconjugated diene typically comprises from about 0.5 to about 12 percent by weight, based on the total weight of the EPDM, although other amounts may also be used.

EPDM terpolymers can be made by a number of methods well known in the art. Illustrative methods for producing EPDM terpolymers can be found, for example, in U.S. Pat. No. 3,280,082 (Natta et al.). Alternatively, EPDM terpolymers can be readily obtained from commercial sources, Commercially available EPDM terpolymers include those available under the trade designations KELTAN (e.g., KELTAN 1446A, KELTAN 2340A, and KELTAN 378Z) from DSM Elastomers Americas of Baton Rouge, La., VISTALON (e.g., VISTALON 2504, VISTALON 6505, and VISTALON 7001) from ExxonMobil Chemical Co. of Houston Tex., NORDEL IP (e.g., NORDEL IP 4520, NORDEL IP 4640, and NORDEL IP 4725P) from Dow Chemical Company of Midland, Mich., and ROYALENE (e.g., ROYALENE 301T, ROYALENE 511, and ROYALENE 535,) from Lion Copolymer LLC. of Baton Rouge, La.

Curable compositions according to the present disclosure also include at least one ethylene-propylene (EPM) copolymer. Generally, the EPM copolymer consists essentially of ethylene and propylene monomer residues, although minor amounts (e.g., less than about 10 percent by weight based on the total weight of the EPM copolymer) of other monomer residues may also be included.

The ethylene-propylene copolymer (EPM) typically contains molar ratios of ethylene to propylene varying between about 95:10 ethylene to about 5:90 propylene, and more typically between about 70:30 ethylene to about 55:45 propylene. Copolymerization may be carried out in the presence of a catalyst in a solvent medium. The polymerization solvent may be any suitable inert organic solvent that is liquid under reaction conditions, and it may be a solvent known for solution polymerization of monoolefins in the presence of Ziegler type catalyst. Examples of satisfactory solvents include hydrocarbon solvents such as straight chain paraffins having from 5-8 carbon atoms (e.g., hexane); aromatic hydrocarbons (e.g., benzene or toluene; and alicyclic hydrocarbons having boiling point ranges approximating those of the straight chain paraffin hydrocarbons and aromatic hydrocarbons described above, and typically saturated cyclic hydrocarbons having 5-6 carbon atoms in the ring nucleus. The solvent selected may be a mixture of one or more of the foregoing hydrocarbons, typically a mixture of aliphatic and naphthenic hydrocarbons having approximately the same boiling range as normal hexane. It is desirable that the solvent be dry and free of substances that will interfere with the Ziegler-type catalyst that may be used in the copolymerization reaction.

Ziegler catalysts may be used. Such Ziegler type catalysts are disclosed in a large number of patents, such as: U.S. Pat. No. 2,933,480 (Gresham); U.S. Pat. No. 3,093,620 (Gladding et al.); U.S. Pat. No. 3,093,621 (Gladding); U.S. Pat. No. 3,211,709 (Adamek et al.); and U.S. Pat. No. 3,113,115 (Ziegler et al.). Examples of Ziegler catalysts include metal organic coordination catalysts prepared by contacting a compound of a heavy metal of the group IV-a, V-a, VI-a and VII-a of the Mendeleev periodic system of elements, such as titanium, vanadium and chromium halides with an organometallic compound of a metal of groups I, II or III of the Mendeleev periodic system which contains at least one carbon-metal bond such as, for example, trialkylaluminum, and allylaluminum halides in which the alkyl groups contain from 1-20 and more typically from 1-4 carbon atoms.

Alternatively, EPM copolymers can be readily obtained from commercial sources. Commercially available EPM terpolymers include those available under the trade designations: KELTAN (e.g., KELTAN 1200A) and PA 1305 from DSM Elastomers Americas of Baton Rouge, La., and EASTOFLEX (e.g., EASTOFLEX 1003, EASTOFLEX 1005, EASTOFLEX 1016, EASTOFLEX 1030, EASTOFLEX 1045, EASTOFLEX 1060, EASTOFLEX 1080, and EASTOFLEX 1200) from Eastman Chemical Co. of Kingsport, Tenn.; and TRILENE (e.g., TRILENE CP-80, TRILENE CP1100, and TRILENE CP5000) from Lion Copolymer LLC. of Baton Rouge, La.

Curable compositions according to the present disclosure may optionally include at least one Type-I photoinitiator. Type-I photoinitiators (i.e., Norrish Type-I photoinitiators) are carbonyl group-containing molecules that undergo α-cleavage of an excited carbonyl compound upon irradiation to yield free radicals such as an acyl-alkyl radical pair (e.g., from an acyclic carbonyl compound) or an acyl-alkyl diradical (e.g., from a cyclic carbonyl compound)) as a primary photoproduct. Examples include: benzoin derivatives; benzil ketals such as 2,2-dimethoxy-2-phenylacetophenone, and dimethoxyacetophenone; α-hydroxyalkylphenones such as 1-hydroxycyclohexylphenyl ketone and 2-hydroxy-2-methyl-1-phenylpropanone; α-aminoalkylphenones such as 2-methyl-1-[4-(methylthio)phenyl]-2-morpholino-propan-2-one, and 2-benzyl-2-dimethylamino-1-(4-morpholinophenyl)butan-1-one; phosphorus containing compounds such as monoacylphosphine oxides (e.g., 2,4,6-trimethylbenzoyldiphenylphosphine oxide) and diacylphosphine oxides (e.g., bis(2,4,6-trimethylbenzoyl)phenylphosphine oxide and bis(2,6-dimethoxy benzoyl)-2,4,4-trimethylpentylphosphine oxide), Exemplary commercially available Type-I photoinitiators include those available under the trade designations IRGACURE (e.g., IRGACURE 651, IRGACURE 184, IRGACURE 500, and IRGACURE 907) and DAROCUR (e.g., DAROCUR 1173, DAROCUR 4265, and DAROCUR TPO) from Ciba Specialty Chemicals of Tarrytown, N.Y.

Optionally, a sensitizer may be included in the curable composition and/or pressure-sensitive adhesives of the present disclosure. A sensitizer can be any compound which is capable of absorbing light (i.e., energy) at a wavelength shorter than that of the photoinitiator and transferring the absorbed energy to the photoinitiator. Curing is then initiated by the photoinitiator itself. Suitable sensitizers include, for example, xanthones, thioxanthones, benzophenones, and derivatives thereof.

Curable compositions according to the present disclosure also include at least one bis(halomethyl)triazine crosslinker. The bis(halomethyl)triazine crosslinker typically is described by the general formula:

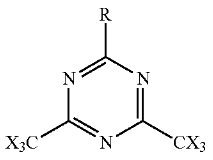

wherein R represents a conjugated chromophore electronically coupled to the triazine ring, and wherein X represents Cl or Br. While other halogens may be used in some cases, bromine and, especially, chlorine are most typically used. If excited by radiation (e.g., visible or ultraviolet electromagnetic radiation), a carbon-halogen bond of the bis(halomethyl)triazine crosslinker cleaves resulting in a halogen radical and a triazine-containing-radical moiety. The process may be repeated for additional halogen atoms of the photoinitiator, resulting in formation of crosslinks within the curable composition and/or pressure-sensitive adhesive.

Exemplary bis(halomethyl)triazine crosslinkers include 2-(4-methoxyphenyl)-4,6-bis(trichloromethyl)-1,3,5-triazine; 2,4-bis(trichloromethyl)-6-(p-methoxy)styryl-s-triazine; 2,4-bis(trichloromethyl)-6-(3,4-dimethoxy)styryl-s-triazine; and 2,4-bis(trichloromethyl)-6-(3,4-dimethoxy) styryl-s-triazine; which are commercially available as Photoinitiator-6104, Photoinitiator 6110, Photoinitiator 6113, and Photoinitiator 6114, respectively, from Sino Great Enterprise Ltd. of Changsha, Hunan, China.

The amount of bis(halomethyl)triazine crosslinker included in the curable composition is typically in an amount of from 0.01 to 10 percent by weight, more typically from 0.2 to 5 percent by weight, based on a total weight of the curable composition, although other amounts may also be used.

Curable compositions according to the present disclosure also include at least one tackifier. Useful tackifiers typically have a low molecular weight relative to the EPDM terpolymer and EPM copolymer, and have a glass transition temperature ($T_g$) higher than that of the EPDM terpolymer or EPM copolymer. Exemplary tackifiers include: rosin and rosin derivatives, aromatic hydrocarbon resins, aliphatic hydrocarbon resins, alicyclic hydrocarbon resins, and terpene resins. Suitable aromatic hydrocarbon tackifiers are commercially available under the trade designations REGALREZ 1094 from Eastman Chemical Resins, Inc. of Kingsport, Tenn., and ARKON P-90, P-100, P-115, P-125, and P-140 from Arakawa Chemical (USA) Inc. of Chicago, Ill. Suitable alicyclic hydrocarbon tackifiers are commercially available under the trade designations ESCOREZ 5400 and ESCOREZ 5415 from ExxonMobil Corp. of Baton Rouge, La., Hydrogenated tackifiers are generally desirable, since they typically do not interfere with UV curing processes. Typically, the tackifier comprises from 10 to 200 parts by weight per 100 parts by weight of components a) and b) combined; more typically, from 50 parts to 100 parts by weight per 100 parts by weight of components a) and b) combined, although other amounts may also be used.

Optionally, the components of the curable composition may include a polyfunctional (meth)acrylate. As used herein, the term "(meth)acrylate" encompasses both "acrylate" and "methacrylate", and the term "polyfunctional (meth)acrylate" refers to a compound having at least two (meth)acrylate groups. Polyfunctional (meth)acrylates are widely available from commercial sources. Useful polyfunctional (meth)acrylates include di(meth)acrylates, tri(meth)acrylates, and tetra (meth)acrylates. Examples include 1,6-hexanediol di(meth) acrylate, poly(ethylene glycol)di(meth)acrylates, trimethylolpropane tri(meth)acrylate, pentaerythritol tetra (meth)acrylate, poly(propylene glycol) di(meth)acrylates, polybutadiene di(meth)acrylate, polyurethane di(meth)acrylates, propoxylated glycerin tri(meth)acrylate, and mixtures thereof. Typically, the polyfunctional (meth)acrylate is present in an amount of less than 15 percent by weight, based on a total weight of the curable composition, although higher or lower amounts may also be used. For example, the polyfunctional (meth)acrylate may present in an amount in a range of from 0.1 to 10 percent by weight, or even in a range of from 2 to 10 percent by weight, based on a total weight of the curable composition.

Optionally, additives such as fillers, pigments, dyes, plasticizers, fibrous reinforcing agents, foaming agents, blowing agents, ceramic microspheres, glass microspheres, polymeric microspheres, antioxidants, stabilizers, processing oils, fire retardants, viscosity adjusting agents, and combinations thereof may be included in the curable compositions and/or pressure-sensitive adhesives. The additives are added in amounts suitable to achieve the properties desired for the end use.

In some embodiments, the curable composition is formulated such that the curable composition is hot melt extrudable; that is, it can be readily extruded using polymer extrusion equipment such as, for example, a single-screw or twin-screw extruder.

The pressure-sensitive adhesive composition according to the present disclosure can be made via a solvent-free or solvent-based process. Typically, the composition is made via an essentially solvent-free, most typically solvent-free, process. Curable compositions and pressure-sensitive adhesives according to the present disclosure can be prepared, for example, using standard melt-mixing equipment such as reciprocating single screw extruders, twin screw extruders, and kneaders. In some cases, it may be desirable to use two or more pieces of equipment in line to provide sufficient melt mixing of the composition.

In one method, at least components a) and b) are melted in a hot melt mixer or single screw extruder, and then fed to a twin screw extruder having one or more feed ports through which the tackifier, Type-I photoinitiator, bis(halomethyl) triazine crosslinker, optional polyfunctional (meth)acrylate, and any other optional additives can then be fed to the extruder. Optional additives may be introduced by themselves through a feed port, or they may be pre-blended with other additives and then fed through the feed port. If the component to be added is a liquid, such as some of the polyfunctional (meth)acrylates, it can be pumped to a port and dripped in at a controlled rate using a peristaltic pump. The screw speed and temperatures for the extruder are set to produce sufficient shear and extensional mixing at high enough temperatures for a sufficient amount of time to mix the components a) and b) with the downstream components. Immiscible materials are typically compounded together using dispersive and distributive mixing actions to form a uniform dispersion.

Extruder barrel temperatures are typically set between about 100° C. and about 180° C. with an increasing temperature profile. Temperatures may be varied depending on the particular composition and the desired amount of mixing. The composition typically exits the extruder barrel and is pumped into a flexible hose and through a die with an opening set to provide the desired adhesive thickness.

Typically, the composition according to the present disclosure is coated onto a suitable substrate using an extrusion film die; for example, using a contact coating die or a drop coating die. The coated curable composition can then, optionally, be cured in line or it may optionally be cured at a later time. For example, the coated composition may be cooled and wound into a roll for later curing. Alternatively, compounded extrudate may be pumped into a form, such as a rope or stick, for later remelting, remixing, and coating onto a substrate and curing.

The coated curable composition can be cured by exposure to radiation such as electron beam, gamma, or actinic radiation (i.e., ultraviolet and/or visible light). Commercially available electron beam curing devices such as those available from, for example, Energy Sciences Incorporated of Wilmington, Del., are suitable for carrying out the curing step. Typical electron beam dosage required to cure the curable composition to form a pressure-sensitive adhesive ranges from about 1 to about 20 megarads (Mrad), more typically from about 2 to about 15 Mrad.

Curable compositions according to the present disclosure can be cured using a source of actinic radiation. Useful wavelengths of actinic radiation will typically depend on at least the absorbance profiles of the bis(halomethyl)triazine crosslinker and the Type-I photoinitiator. The wavelength range for the actinic radiation is typically from about 250 to about 400 nanometers, although wavelengths outside of this range can potentially be used. The energy dose is typically from about 100 to about 5000 millijoules/cm$^2$, more typically about 500 to about 3000 milliJoules/cm2, although other amounts may also be used. Useful sources of actinic radiation include, for example, flash lamps low pressure mercury lamps, medium pressure mercury lamps, lasers, light emitting diodes, and microwave driven lamps. Such systems are available from Fusion UV Systems, Inc. of Gaithersburg, Md., which may have either an 1-type or D-type bulb.

In practice of methods according to the present disclosure, the composition is typically coated onto a substrate. The substrate may be a film, foam, woven web, or nonwoven web, for example. Suitable substrates include, for example, materials that are polymeric, glass, ceramic, metal, and combinations thereof. The substrate may be in any suitable form such as a sheet, web, or a three-dimensional object. The substrate may be positioned in an inert atmosphere or vacuum prior to at least partially curing the curable composition. The choice of substrate may affect the formulation of the curable composition and/or pressure-sensitive adhesive. For example, while the weight ratio of component a) to component b) is typically in a range of from 15:85 to 35:65 when the substrate is a foil, nonwoven fabric, or polymeric film, the weight ratio of component a) to component b) is typically in a range of from 35:65 to 65:35 when the substrate is a polymeric foam.

Particularly useful substrates are tape backings. Suitable tape backings include oriented and unoriented polymeric films, woven and nonwoven fabrics, metal foils, and polymeric foams.

Tape backings can be made from various materials, which include, but are not limited to, polyethylene, polypropylene, cellulose, polyester, polyacrylic, and polyimide.

In one embodiment of an adhesive article according to the present disclosure, shown in FIG. 1, the adhesive article 100 comprises a substrate 110 having a first major surface 120 with first pressure-sensitive adhesive 130 according to the present disclosure adhered thereto. In some embodiments, first pressure-sensitive adhesive 130 is releasably adhered to substrate 100 (i.e., substrate 100 is a release liner), while in others the first pressure-sensitive adhesive 130 is permanently adhered to substrate 100.

The pressure-sensitive adhesive composition can also be made into an adhesive transfer tape in which a layer of the pressure-sensitive adhesive composition is coated onto one or two release liners. Suitable release liners include, but are not limited to, polymeric films and papers that have been treated with a release agent such as, for example, a silicone. Accordingly, first pressure-sensitive adhesive 130 may be releasably adhered to release liner 160.

Figure 2:
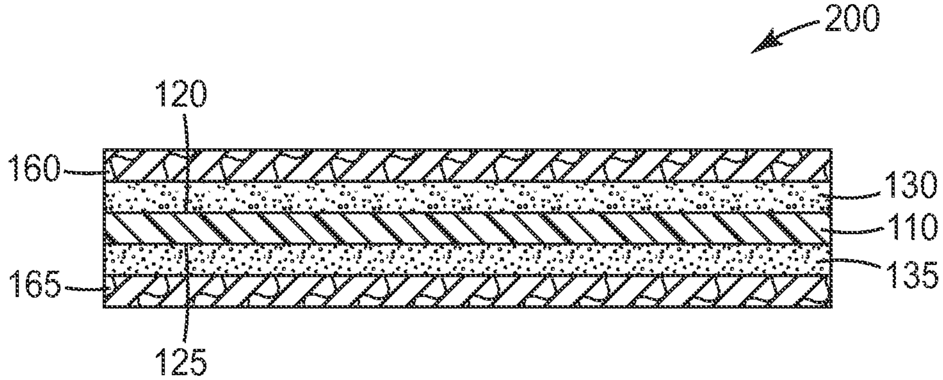
FIG. 2 is a side view of another exemplary adhesive article according to one embodiment of the present disclosure.

In another embodiment, shown in FIG. 2, an adhesive article 200 comprises a substrate 110 having a first major surface 120 with a first pressure-sensitive adhesive 130 according to the present disclosure adhered thereto, Second pressure-sensitive adhesive 135 is adhered to second major surface 125, opposite first major surface 120 of substrate 110. First and second pressure-sensitive adhesives 130, 135 are releasably adhered to respective release liners 160, 165.

The coated curable composition on the release liner can then be at least partially cured and the coated liner wound into a roll. The roll is subsequently unwound, the composition is applied to a surface, and the release liner is removed to allow adherence of the composition to an additional surface. Alternatively, the coated curable composition on the liner may be applied to a desired surface and then cured on the surface either with or without the liner depending upon the type of liner and the method of curing. Further, the curable composition on the liner may be used to attach two substrates by applying the composition to one substrate, removing the liner, adhering a second substrate to the composition, and at least partially curing the composition between the substrates provided, that at least one of the substrates is transparent to the type of radiation used for curing.

Objects and advantages of this disclosure are further illustrated by the following non-limiting examples, but the particular materials and amounts thereof recited in these examples, as well as other conditions and details, should not be construed to unduly limit this disclosure.

EXAMPLES

Unless otherwise noted, all parts, percentages, ratios, etc. in the Examples and the rest of the specification are by weight.

Materials used in the examples are set forth in Table 1 (below).

TABLE 1

| ABBREVIATION | DESCRIPTION | TRADE DESIGNATION | SUPPLIER |
|---|---|---|---|
| 1446A | an EPDM polymer containing 60% ethylene and 6.6% ethylidene norbornene, with a Mooney viscosity of 10 (ML 1 + 4 (125° C.)), and having a weight average molecular weight (Mw) of about 105,000 grams/mole. | KELTAN 1446A | DSM Elastomers of Baton Rouge, Louisiana |
| V2504 | An EPDM polymer containing 58% ethylene and 4.7% ethylidene norbornene, with a Mooney viscosity of 25 (ML 1 + 4 (125° C.)), and having an Mw of about 174,000 grams/mole. | VISTALON 2504 | Exxon Mobil Corporation of Houston, Texas |

TABLE 1-continued

| ABBREVIATION | DESCRIPTION | TRADE DESIGNATION | SUPPLIER |
|---|---|---|---|
| V6505 | An EPDM polymer containing 57% ethylene and 9.2% ethylidene norbornene, with a Mooney viscosity of 53 (ML 1 + 4 (125° C.)). | VISTALON 6505 | Exxon Mobil Corporation |
| V7001 | An EPDM polymer containing 73% ethylene and 5.0% ethylidene norbornene, with a Mooney viscosity of 60 (ML 1 + 4 (125° C.)). | VISTALON 7001 | Exxon Mobil Corporation |
| K1200A | An EPM polymer containing 49% ethylene, with a Mooney viscosity of 2.5 (ML 1 + 4 (125° C.)), and having an Mw of about 84,000 grams/mole. | KELTAN 1200A | DSM Elastomers |
| PA1305 | An EPM polymer containing 49 percent ethylene residues | PA 1305 | DSM Elastomers |
| ES5400 | A hydrocarbon tackifier resin, having a weight average molecular weight (Mw) of about 400 grams/mole, a softening point of 103° C., and a glass transition temperature of about 50° C. | ESCOREZ 5400 | Exxon Mobil Corporation |
| R1094 | A hydrocarbon tackifier resin, having an Mw of about 850 grams/mole, a softening point of 95° C., and a glass transition temperature of about 40° C. | REGALREZ 1094 | Eastman Chemical of Kingsport, Tennessee |
| 222B | Process oil; used as plasticizer. | NYFLEX 222B | Nynas AB, Stockholm, Sweden |
| SR454 | ethoxylated (3) trimethylpropane triacrylate; a low viscosity, trifunctional acrylate monomer having a molecular weight of 428. | SR 454 | Sartomer Co. of Exton, Pennsylvania |
| TRIAZ1 | 2,4-bis(trichloromethyl)-6-(4-methoxyphenyl)-1,3,5-triazine, crosslinker | | Preparable according to U.S. Pat. No. 4,330,590 (Vesley) |
| TRIAZ2 | 2,4-bis(trichloromethyl)-6-(3,4-dimethoxyphenyl)-1,3,5-triazine, crosslinker | | Preparable according to U.S. Pat. No. 4,330,590 (Vesley) |
| PI1 | 2,2-dimethoxy-1,2-diphenylethan-1-one, photoinitiator | IRGACURE 651 | Ciba Specialty Chemicals of Tarrytown, New York |
| EPDM | ethylene propylene diene class M rubber; having a durometer hardness of 60, measuring 2 inches × 5 inches × 0.059 inches (5 cm × 13 cm × 0.15 cm) | Cat. No. RZW07-015 | Zatkoff Seals & Packings of Warren, Michigan |
| EPDM/PP | a SANTOPRENE 201-55 (a thermoplastic vulcanizate of ethylene propylene diene class M rubber (EPDM) and polypropylene) panel measuring 2 inches × 5 inches × 0.084 inches (5 cm × 13 cm × 0.21 cm) | Cat. No. RZW07-016 | Zatkoff Seals & Packings |
| SS | 18 gauge stainless steel, bright annealed finish. | Stainless Steel 304 | ChemInstruments, Inc. of Fairfield, Ohio |
| PP | polypropylene panel measuring 2 inches × 5 inches × 0.084 inches (5 cm × 13 cm × 0.21 cm) | PROTEUS HOMOPOLYMER POLYPROPYLENE | QUADRANT Engineering Plastics Products USA, Inc. of Reading, Pennsylvania |
| TPO | thermoplastic polyolefin, panel; measuring 4 inches × 6 inches × 0.125 inches (10 cm × 15 cm × 0.3 cm) | HIFAX ETA-3131 THERMOPLASTIC OLEFIN RESIN | LyondellBasell Industries of Rotterdam, South-Holland, The Netherlands. |
| PE | a chemically treated, clear polyester film having a thickness of 0.002 inch (50 micrometers) | HOSTAPHAN 3SAB SILICONE ADHERABLE FILM | Mitsubishi Polyester Film, Incorporated, Greer, SC |
| 9775 | An adhesive transfer tape having an acrylic pressure-sensitive adhesive on one side of a polycoated Kraft paper liner, with an adhesive thickness of 0.005 inch (0.13 mm) and a liner thickness of 0.0042 inch (0.11 mm) | 3M Adhesive Transfer Tape 9775 | 3M Company of St. Paul, Minnesota |
| 9816DC | 3.5 mils thickness (89 micrometers) double-coated, white polyester film carrier with rubber adhesive on a 74 lb (34 kg) Kraft liner | 3M Adhesive Transfer Tape 9816DC | 3M Company |
| ADCHEM 5000M | A double coated, general purpose tape product having a rubber-based adhesive and a 0.013 mm (0.0005 inch) thick polyester carrier. | ADCHEM 5000M Double Coated Tape | Adchem Corporation of Riverhead, New York |

Test Methods

90° Angle Peel Adhesion Test

Evaluation of peel adhesion strength at an angle of 90° was performed as described in the ASTM International standard, D3330, Method F, with a 0.5 inch×8 inches (1.3 cm×20 cm) test sample using an IMASS SP-2000 slip/peel tester (available from IMASS, Inc. of Accord, Mass.) at a peel rate of 12 inches/minute (305 mm/minute). The samples were adhered to the test panels by rolling down the tapes with a 2.0 kg (4.5 lb.) rubber roller using four passes. The test panels included EPDM, EPDM/PP, PP, SS, and TPO. The peel tests were performed after a certain dwell time in a controlled environment room on the test panels. The average peel adhesion force required to remove the tape from the panel was recorded in ounces and expressed in Newtons/decimeter (N/din), based on 3 replicates.

70° C. Static Shear Test

Evaluation of static shear strength was performed as described in the ASTM International standard, D3654, Procedure A, with a ½ in.×1 in. (1.3 cm×2.5 cm) test sample and a 500 g load inside an oven set at 70° C. The test panels were stainless steel ("SS"), Time to failure in minutes was recorded, If no failure was observed after 10,000 minutes, the test was stopped and a value of 10,000+ minutes was recorded.

Examples 1-8 and Comparative Examples A-B

Adhesive samples were prepared by blending an EPDM elastomer with a low molecular weight EPM polymer (K1200A). The adhesive samples also included a hydrogenated hydrocarbon tackifier (ES5400) and a plasticizer (222B). TRIAZ1, SR454, and IRG651 were included as curing agents. The compositions of the adhesive samples are reported in Table 2 (below).

TABLE 2

| ADHESIVE SAMPLE | EPDM POLYMER | EPDM, parts | K-1200A, parts | ES5400, parts | 222B, parts | PI1, parts | TRIAZ1, parts | SR454, parts |
|---|---|---|---|---|---|---|---|---|
| A | K1446A | 100 | 0 | 100 | 10 | 0.48 | 0.3 | 0.0 |
| 1 | K1446A | 85 | 15 | 100 | 10 | 0.48 | 0.3 | 2.5 |
| 2 | K1446A | 70 | 30 | 100 | 10 | 0.48 | 0.3 | 2.5 |
| 3 | K1446A | 55 | 45 | 100 | 10 | 0.48 | 0.3 | 2.5 |
| 4 | K1446A | 40 | 60 | 100 | 10 | 0.48 | 0.3 | 2.5 |
| 5 | K1446A | 25 | 75 | 100 | 10 | 0.48 | 0.3 | 2.5 |
| B | K1446A | 0 | 100 | 100 | 10 | 0.48 | 0.3 | 2.5 |
| 6 | V2504 | 25 | 75 | 100 | 10 | 0.48 | 0.3 | 2.5 |
| 7 | V6505 | 25 | 75 | 100 | 10 | 0.48 | 0.3 | 2.5 |
| 8 | V7001 | 25 | 75 | 100 | 10 | 0.48 | 0.3 | 2.5 |

For each adhesive sample, all ingredients were placed in a glass jar and toluene was added to give a solution of 25 percent to 35 percent solids by weight. The jar was capped shut and put on a roller for 48 hours (hrs) for mixing. The resultant adhesive solution was then coated onto the treated side of the PE film backing using a 6-inch (15-cm) wide knife coater. The coating gap was set to provide an adhesive having a thickness of 0.051 mm (0.002 inches) after drying in an air-circulating oven at 160° F. (71° C.) for 10 to 15 minutes. Then, the dried adhesive films were cured by passing them twice underneath a mercury lamp equipped with a 400 watts/inch (157 watts/cm) Fusion UV Systems D bulb (model DRS-120 UV PROCESSOR from Fusion UV Systems, Inc. of Gaithersburg, Md.), in air, at a convey belt speed of 3 m/min. Under this condition a total UVA energy of 3000 mJ/cm$^2$ was measured with an EIT POWER PUCK from EIT, Inc. of Sterling, Va. The adhesive side of the resulting adhesive tape was covered with a release liner and stored in a controlled environment room (23° C. and 50 percent relative humidity) until tested.

Each adhesive tape was tested according to the 90° Angle Peel Adhesion Test using EPDM as the substrate. Each adhesive tape was also tested according to the 70° C. Static Shear Test using stainless steel as the substrate. The results are summarized in Table 3 (below).

TABLE 3

| | ADHESIVE SAMPLE | 90° PEEL ADHESION ON EPDM (N/dm) 30 minutes dwell | 24 hours dwell | 72 hours dwell | 70° C. STATIC SHEAR STRENGTH, minutes |
|---|---|---|---|---|---|
| COMPARATIVE EXAMPLE A | A | 14 | 34 | 49 | 10,000+ |
| EXAMPLE 1 | 1 | 28 | 56 | 57 | 10,000+ |
| EXAMPLE 2 | 2 | 25 | 55 | 59 | 10,000+ |
| EXAMPLE 3 | 3 | 27 | 63 | 62 | 10,000+ |
| EXAMPLE 4 | 4 | 33 | 87 | 114 | 10,000+ |
| EXAMPLE 5 | 5 | 35 | 110 | 89 | 10,000+ |
| COMPARATIVE EXAMPLE B | B | 39 | 44 | 30 | 23 |
| EXAMPLE 6 | 6 | 48 | 137 | 114 | 10,000+ |
| EXAMPLE 7 | 7 | 40 | 82 | 116 | 10,000+ |
| EXAMPLE 8 | 8 | 37 | 91 | 87 | 1481 |

Examples 9-15 and Comparative Examples C-D

Adhesive samples 9-15 and C-D were prepared according to the procedure of adhesive sample 1 with compositional changes as reported in Table 4 (below).

TABLE 4

| ADHESIVE SAMPLE | V2504, parts | K-1200A, parts | R1094, parts | PI1, parts | TRIAZ1 parts | SR454, parts |
|---|---|---|---|---|---|---|
| C | 100 | 0 | 100 | 0.48 | 0.3 | 5.0 |
| 9 | 75 | 25 | 100 | 0.48 | 0.3 | 5.0 |
| 10 | 50 | 50 | 100 | 0.48 | 0.3 | 5.0 |
| 11 | 35 | 65 | 100 | 0.48 | 0.3 | 5.0 |
| 12 | 25 | 75 | 100 | 0.48 | 0.3 | 5.0 |
| 13 | 15 | 85 | 100 | 0.48 | 0.3 | 5.0 |
| 14 | 10 | 90 | 100 | 0.48 | 0.3 | 5.0 |
| 15 | 25 | 75 | 100 | 0.00 | 0.6 | 0.0 |
| D | 25 | 75 | 100 | 0.48 | 0.0 | 5.0 |

The adhesive samples were coated on PE film backing, and then coated, cured and dried as in Example 1. The resultant adhesive tapes were then tested according to the 90° Angle Peel Adhesion Test using the EPDM substrate and the 70° C. Static Shear Test using the stainless steel substrate with a 500 g weight. Testing results are reported in Table 5 (below).

TABLE 5

| | | 90° PEEL ADHESION ON EPDM, N/dm | | | 70° C. STATIC |
|---|---|---|---|---|---|
| | ADHESIVE SAMPLE | 30 minutes dwell | 24 hours dwell | 72 hours dwell | SHEAR STRENGTH, minutes |
| COMPARATIVE EXAMPLE C | C | | 27 | 46 | 10,000+ |
| EXAMPLE 9 | 9 | | 39 | 45 | 10,000+ |
| EXAMPLE 10 | 10 | | 33 | 54 | 10,000+ |
| EXAMPLE 11 | 11 | | 88 | 83 | 10,000+ |
| EXAMPLE 12 | 12 | 35 | 100 | 104 | 10,000+ |
| EXAMPLE 13 | 13 | | 84 | 94 | 2,406 |
| EXAMPLE 14 | 14 | | 60 | 83 | 213 |
| EXAMPLE 15 | 15 | 35 | 77 | 76 | 10,000+ |
| COMPARATIVE EXAMPLE D | D | | | | 8 |

Examples 16-20

Examples 16-20 were prepared following the procedure used in Example 12, except the amounts of the curing agents used, and curing conditions, were varied. For these examples, the amounts of TRIAZ1, PI1, and SR454 were increased to 0.6 part, 0.96 part, and 10 parts respectively, based on 100 parts of EPDM and EPM polymers.

Examples 16-19 were cured by UV irradiation and the UV energy was varied by changing the convey belt speed on the Fusion UV processor.

Example 20 was cured using Electrical-Beam (EB) irradiation, after covering the adhesive side of the sample with a silicone release liner, by passed the coated film PE backing through an ELECTOCURTAIN CB-300 electron beam system from Energy Sciences, Inc. of Wilmington, Mass. with the PE film side close to the irradiation source, under nitrogen atmosphere. The EB machine was operated at 230 keV and a dose of 12 MRad was used.

Each adhesive tape was tested according to the 90° Angie Peel Adhesion Test using EPDM as the substrate. Each adhesive tape was also tested according to the 70° C. Static Shear Test using stainless steel as the substrate. Testing results, and curing conditions, are reported in Table 6 (below).

TABLE 6

| | | 90° PEEL ADHESION ON EPDM, N/dm | | | 70° C. STATIC |
|---|---|---|---|---|---|
| | UVA ENERGY OR EB DOSAGE | 30 minutes dwell | 24 hours dwell | 72 hours dwell | SHEAR STRENGTH, minutes |
| EXAMPLE 16 | 600 $mJ/cm^2$ | 47 | 154 | 74 | 745 |
| EXAMPLE 17 | 1000 $mJ/cm^2$ | 40 | 120 | 96 | 10,000+ |
| EXAMPLE 18 | 1500 $mJ/cm^2$ | 40 | 128 | 96 | 10,000+ |
| EXAMPLE 19 | 3000 $mJ/cm^2$ | 39 | 71 | 73 | 10,000+ |
| EXAMPLE 20 | 12 Mrad | 66 | 97 | 102 | 10,000+ |

Examples 21-24

Adhesive samples 9-12 were also evaluated in a multilayer foam tape construction. The core layer in the foam tape was a 914 micrometer (36 mils) thick foam sheet prepared as described in publication WO 2007/149851 A1 (Daniels et al.), pages 28-30. Adhesive films of adhesive samples 9 to 12 were coated at 50 micron meters (2 mils) thick between release liners and cured as in Example 1. The adhesive was then laminated to both sides of the foam core and one side of the resulting foam tape was adhered to an aluminum foil backing having a thickness of 0.08 mm (0.003 inch). The resultant adhesive tapes were put in a 70° C. oven for one hour to ensure good adhesion between layers. After cooling down, the other side of the foam tape was laminated to PP and TPO panels and subjected to the 90° Peel Adhesion Test. The adhesives used and peel performances of adhesive-containing foam tape examples Example 21 to 24, laminated to PP and TPO) substrates, are reported in Table 7. In Table 7, "af" refers to adhesive failure. "fs" refers to foam split and "fs/af" refers to a combination of adhesive failure and foam split.

TABLE 7

| | | 90° PEEL ADHESION ON PP, N/dm | | | 90° PEEL ADHESION ON TPO, N/dm | | |
|---|---|---|---|---|---|---|---|
| | ADHESIVE SAMPLE | 20 minutes dwell | 1 hour dwell | 24 hours dwell | 20 minutes dwell | 1 hour dwell | 24 hours dwell |
| EXAMPLE 21 | 9 | 453 (fs/af) | 228 (af) | 552 (fs) | 581 (fs) | | |
| EXAMPLE 22 | 10 | 523 (fs/af) | 565 (fs) | | 539 (fs) | | |
| EXAMPLE 23 | 11 | 378 (af) | 525 (fs) | | 544 (fs) | | |
| EXAMPLE 24 | 12 | 397 (at) | 338 (af) | 527 (fs) | 493 (fs/af) | 541 (fs) | |

Comparative Examples E-G and Examples 25-27

Adhesive samples 25-27 were compounded as reported in Table 8 and extruded using a twin-screw co-rotating extruder ZSK-30 (Werner & Pfleiderer Corp. of Ramsey, N.J.). The extruder barrel temperature was set at 275° F. (135° C.). All the ingredients of the compositions were fed into the extruder manually via an open port. They were then allowed to mix in the extruder for 4 minutes at a screw speed of 300 rpm with the extruder outlet closed. Then the screw speed was reduced to 100 rpm and the extruder outlet was opened to allow the adhesive to be coated on the primed side of the PE film via a drop coating die. The thickness of the coated adhesive films was controlled at 127 micron meters (5 mils).

TABLE 8

| ADHESIVE SAMPLE | EPDM POLYMER | EPM POLYMER | TACKIFIER | EPDM, parts | ERM, parts | TACKIFIER, parts | 222B, parts | PI1, parts | TRIAZ2, parts | SR454, parts |
|---|---|---|---|---|---|---|---|---|---|---|
| 25 | V2504 | KI200A | ES5400 | 25 | 75 | 100 | 10 | 0.48 | 0.3 | 7.0 |
| 26 | V2504 | K1200A | R1094 | 25 | 75 | 100 | 0 | 0.48 | 0.3 | 7.0 |
| 27 | V2504 | PA1305 | R1094 | 25 | 75 | 100 | 0 | 0.48 | 0.3 | 7.0 |

After cooling, the adhesive samples were cured by UV irradiation using a total UVA energy of 3000 mJ/cm$^2$ following the same cure procedure as described for Example 1.

Three commercially available tapes (Comparative Examples E-G) were evaluated for peel adhesion strength according to the 90° Angle Peel Adhesion Test. In Comparative Example E (9775), Comparative Example E (9816DC), and Comparative Example F (ADCHEM 5000M), the indicated adhesive film was first laminated to an aluminum panel (0.08 mm thickness) by rolling down the adhesive face of the transfer tape to the foil with a 2.0 kg (4.5 lb.) rubber roller using 4 passes, after which the liner was removed and the resulting adhesive/foil articles were evaluated.

Examples 25-27 and Comparative Examples E-G were tested by the 90° Peel Adhesion Test using EPDM, EPDM/PP, and SS substrates, and by the 70° C. Static Shear Test, One set of samples was tested after 24 hours at 23° C., and a second set was tested after 7 days at 70° C. Results are reported in Table 9 (below).

TABLE 9

| | | 90° PEEL ADHESION ON EPDM, N/dm | | 90° PEEL ADHESION ON EPDM/PP, N/dm | | 90° PEEL ADHESION ON SS, N/dm | | 70° C. |
|---|---|---|---|---|---|---|---|---|
| | ADHESIVE SAMPLE | 24 hours dwell | 7 days 70° C. dwell | 24 hours dwell | 7 days 70° C. dwell | 24 hours dwell | 7 days 70° C. dwell | STATIC SHEAR, minutes |
| Example 25 | 25 | 111 | 123 | 56 | 73 | 178 | 260 | 693 |
| Example 26 | 26 | 88 | 139 | 65 | 110 | 67 | 322 | 7,982 |
| Example 27 | 27 | 68 | 150 | 59 | 93 | 84 | 400 | 10,000+ |
| Comparative Example E | 9775 | 37 | 35 | 72 | 63 | 182 | | 3,054 |
| Comparative Example F | 9816DC | 50 | 57 | 26 | 39 | 171 | | 1 |
| Comparative Example G | ADCHEM 5000M | 11 | 20 | 2 | 20 | | | 2 |

All patents and publications referred to herein are hereby incorporated by reference in their entirety. All examples given herein are to be considered non-limiting unless otherwise indicated. Various modifications and alterations of this disclosure may be made by those skilled in the art without departing from the scope and spirit of this disclosure, and it should be understood that this disclosure is not to be unduly limited to the illustrative embodiments set forth herein.

What is claimed is:

1. A curable composition comprising components:

a) at least one ethylene-propylene-(nonconjugated diene) terpolymer;

b) at least one ethylene-propylene copolymer;

c) at least one bis(halomethyl)triazine crosslinker; and d) at least one tackifier, wherein a weight ratio of component a) to component b) is in a range of from 15:85 to 85:15.

2. The curable composition of claim 1, wherein the components further comprise:

e) at least one Type-I photoinitiator; and f) at least one polyfunctional (meth)acrylate.

3. The curable composition of claim 1, wherein the curable composition is hot melt extrudable.

4. A method of making a pressure-sensitive adhesive, the method comprising at least partially curing the curable composition of claim 1.

5. The method of claim 4, wherein the at least partially curing comprises exposing the curable composition to actinic radiation.

6. A pressure-sensitive adhesive comprising an at least partially crosslinked reaction product of components comprising:

a) at least one ethylene-propylene-nonconjugated diene terpolymer;

b) at least one ethylene-propylene copolymer;

c) at least one bis(halomethyl)triazine crosslinker; and d) at least one tackifier, wherein a weight ratio of component a) to component b) is in a range of from 15:85 to 85:15.

7. The pressure-sensitive adhesive of claim 6, wherein the components further comprise:

e) at least one Type-I photoinitiator; and f) at least one polyfunctional (meth)acrylate.

8. The pressure-sensitive adhesive of claim 6, wherein a weight ratio of component a) to component b) is in a range of from 15:85 to 35:65.

9. The pressure-sensitive adhesive of claim 6, wherein a weight ratio of component a) to component b) is in a range of from 35:65 to 65:35.

10. The pressure-sensitive adhesive of any one of 6, wherein component d) is present in an amount of from 50 to 150 parts by weight per hundred parts by weight of components a) and b) combined.

11. The pressure-sensitive adhesive of claim 6, wherein the tackifier comprises a hydrogenated tackifier.

12. The pressure-sensitive adhesive of claim 6, wherein the curable composition is hot melt extrudable.

13. An adhesive article comprising a first pressure-sensitive adhesive according to claim 6 adhered to a first major surface of a substrate.

14. The adhesive article of claim 13, wherein the first pressure-sensitive adhesive is releasably adhered to the substrate.

15. The adhesive article of claim 13, wherein the substrate comprises at least one of a polymer film and a metal foil.

16. The adhesive article of claim 13, wherein the substrate comprises a foam.

* * * * *

UNITED STATES PATENT AND TRADEMARK OFFICE

CERTIFICATE OF CORRECTION

PATENT NO. : 9,074,087 B2
APPLICATION NO. : 13/635049
DATED : July 7, 2015
INVENTOR(S) : Zhong Chen It is certified that error appears in the above-identified patent and that said Letters Patent is hereby corrected as shown below:

Specification

Column 1
Line 57, Delete “art” and insert -- an --, therefor.

Column 3
Line 26, Delete “sources,” and insert -- sources. --, therefor.

Column 4
Line 49, Delete “oxide),” and insert -- oxide). --, therefor.

Column 5
Line 50, Delete “La.,” and insert -- La. --, therefor.

Column 7
Line 25, Delete “cm2,” and insert -- $cm^2$, --, therefor.

Column 7
Line 31, Delete “1-type” and insert -- H-type --, therefor.

Column 8
Line 22, Delete “thereto,” and insert -- thereto. --, therefor.

Column 11
Line 25, Delete “recorded,” and insert -- recorded. --, therefor.

Column 13
Line 42, Delete “ELECTOCURTAIN” and insert -- ELECTROCURTAIN --, therefor.

Signed and Sealed this
Eighth Day of March, 2016

Michelle K. Lee
*Director of the United States Patent and Trademark Office*

Specification

Column 13
Line 47 (Approx.), Delete “Angie” and insert -- Angle --, therefor.

Column 14
Line 47 (Approx.), Delete “TPO)” and insert -- TPO --, therefor.

Column 14
Line 48 (Approx.), Delete “failure.” and insert -- failure, --, therefor.

Claims

Column 18
Line 1, In Claim 10, delete “any one of 6,” and insert -- claim 6, --, therefor.